United States Patent
Pozhidayev (10) Patent No.: US 11,193,766 B2
(45) Date of Patent: Dec. 7, 2021

(54) APPARATUS AND METHODS IN INSTALLATION OF OBJECTS

(71) Applicant: Ruslan Pozhidayev, Salinas, CA (US)

(72) Inventor: Ruslan Pozhidayev, Salinas, CA (US)

(*) Notice: Subject to any disclaimer, the term of this patent is extended or adjusted under 35 U.S.C. 154(b) by 336 days.

(21) Appl. No.: 16/378,857

(22) Filed: Apr. 9, 2019

(65) Prior Publication Data

US 2020/0326188 A1    Oct. 15, 2020

(51) Int. Cl.
*G01C 15/00* (2006.01)
*G09F 7/16* (2006.01)
*G01C 15/02* (2006.01)

(52) U.S. Cl.
CPC .......... *G01C 15/004* (2013.01); *G01C 15/02* (2013.01); *G09F 7/16* (2013.01)

(58) Field of Classification Search
CPC .......... G01C 15/004; G01C 15/02; G09F 7/16
USPC ........ 33/280, 1 G, 1 CC, 228, 278, 279, 286
See application file for complete search history.

(56) References Cited

U.S. PATENT DOCUMENTS

| | | | | |
|---|---|---|---|---|
| 4,383,373 A * | 5/1983 | Couturier | ............. | G01B 5/0025 33/1 CC |
| 4,910,541 A * | 3/1990 | Morgan | ................. | G03C 11/14 33/613 |
| 5,388,318 A * | 2/1995 | Petta | ........................ | E04B 7/022 29/407.04 |
| 5,588,216 A * | 12/1996 | Rank | ........................ | G01B 11/27 33/286 |
| 6,170,163 B1 * | 1/2001 | Bordignon | ................ | B25H 7/00 269/37 |
| 7,346,847 B2 * | 3/2008 | Etter | ........................ | B23B 25/06 33/286 |
| 7,353,612 B1 * | 4/2008 | Wygle | ..................... | G01B 11/27 33/286 |
| 7,614,154 B2 * | 11/2009 | Cobb | ........................ | B64F 5/10 33/1 BB |
| 7,621,053 B2 * | 11/2009 | Bianchin | ................... | B25H 7/00 269/37 |
| 7,866,052 B2 * | 1/2011 | Schulze | ................... | G01C 15/02 33/1 G |
| 7,908,750 B2 * | 3/2011 | Goick | ................... | A23G 3/0097 33/286 |
| 7,979,992 B2 * | 7/2011 | Filep | ..................... | F41G 7/2233 33/227 |
| 2006/0042105 A1 * | 3/2006 | McGrail | ............... | A63D 15/005 33/286 |
| 2013/0097880 A1 * | 4/2013 | Wernig | .................. | H01Q 3/005 33/228 |
| 2013/0155419 A1 * | 6/2013 | Atkinson | ................ | G01B 11/14 356/616 |
| 2016/0057400 A1 * | 2/2016 | Winter | .................. | H04N 9/3185 348/745 |
| 2017/0337743 A1 * | 11/2017 | Metzler | .............. | H04N 5/23293 |

* cited by examiner

*Primary Examiner* — Christopher W Fulton
(74) *Attorney, Agent, or Firm* — Donald R Boys; Central Coast Patent Agency LLC (57) ABSTRACT

A system for marking points on a surface at a distance has a marker apparatus with a plurality of point light sources mounted individually in apparatus movable by electrical drives to position light spots on a surface at a distance in a pattern, and an electronic power and control system coupled to the marker apparatus, providing signals for manipulating individual ones of the electrical drives of the point light sources to position the light spots in the pattern.

16 Claims, 10 Drawing Sheets

APPARATUS AND METHODS IN INSTALLATION OF OBJECTS

BACKGROUND OF THE INVENTION

1. Field of the Invention

The present invention is in the technical area of construction equipment and processes and pertains more particularly to apparatus for marking locations for mounting holes and for electrical penetrations to mount an object or an assembly to a surface.

2. Description of Related Art

Preparation and mounting of equipment of various sorts, typically on vertical surfaces, such as, for example, a sign on a wall of a building housing a commercial enterprise, is a rather well-known technology. A department store, for example, in a shopping mall, is unknown without one or more signs informing the public that this is a location of a branch of that particular store. Without such signs, potential customers would have no way to know where to go.

Mounting and installation of various assemblies and objects such as, for example, signs, is a necessary process in many circumstances. Whenever a new store is constructed, or whenever an existing structure may be vacated by a previous tenant and occupied by a new tenant, it may be necessary to change signs. Signs for the old tenant may be removed, and signs for the new tenant may be installed. And it is highly unusual if the mounting and electrical service points are the same for two different signs.

As implied above, to mount a sign, or any other assembly or equipment object involves making penetrations in a wall for mounting fasteners, and often also for electrical connections for equipment with electrical functionality, like illumination. The conventional process involves erecting ladders or scaffolds to enable workers to reach the area of a wall where an installation is required. The outer periphery of the area may be determined in a number of ways, and perhaps corners or other boundaries may be marked.

It is important that the area determined for the installation is oriented such that the visual effect is pleasing to those who may observe the result. This may mean that the area is level, or that it conforms to a ground line or a line determined by other assemblies or equipment.

Once the position for the object or assembly is determined, it is usual to apply a template with marks on the template whereby the locations for mounting hardware and electrical connection may be marked through to the mounting surface. Such a template is often a relatively large paper or paperboard panel that may be unrolled and taped or pinned somehow to the mounting surface. A template may also be of cardboard, plastic, or other material, as well.

Once the template is applied to the wall in the area for the sign, and properly oriented, a worker may mark the for fasteners and connection points through the template, and the template may be removed. Once the points are marked through the template, and the template is removed, workers may drill holes and mount anchors and the like at fastener points, and drill holes for electrical lines and conduits to pass through the surface at the points marked for same. Markings may, for example, be of different colors, so it will be apparent what treatment to apply to the wall at each of the marked points.

All of this process may be accomplished on ladders or scaffolding, and templates as described may be difficult to store and reuse and may be subject to wear and tear. Also, separation between points may be affected by different temperatures, and by stretching or shrinking of a template.

What is clearly needed is a system for marking mounting and electrical points for objects and assemblies on a surface quickly and reliably, without need for templates or point-to-point measurements.

BRIEF SUMMARY OF THE INVENTION

In an embodiment of the invention a system for marking points on a surface at a distance is provided, comprising a marker apparatus comprising a plurality of point light sources mounted individually in apparatus movable by electrical drives to position light spots on a surface at a distance in a pattern, and an electronic power and control system coupled to the marker apparatus, providing signals for manipulating individual ones of the electrical drives of the point light sources to position the light spots in the pattern.

In one embodiment the system further comprises a computerized appliance, being one of a smartphone, a laptop computer, or a pad device, executing an application providing interactive interfaces on a display of the appliance, enabling input of commands for manipulating the electrical drives. Also, in one embodiment the system further comprises a CPU in the electronic power and control system executing software and coupled to a data repository comprising data for controlling the marker apparatus to position the point light sources to provide the light spots in the pattern. IN In one embodiment the data is in a data file stored on the computerized appliance and executed by the application to control the marker apparatus. And in one embodiment the electrical drives comprise electrical motors driving compound planetary gear trains with output shafts driving physical apparatus in which individual point light sources are mounted, and the output shafts are torque-biased in one direction to eliminate any play in motor apparatus or gear trains.

In one embodiment of the system individual ones of the point light sources are mounted in physical apparatus wherein one electrical drive is enabled to rotate a point light source in a first plane defined by an axis of the point light source, the rotation providing translation of a light spot in a line on the surface. Also, in one embodiment a plurality of point light sources with drives moving the sources in the first plane are mounted on a surface driven by a separate electrical drive to rotate the point light sources mounted on the surface in a second plane orthogonal to the first plane. Also, in one embodiment the electrical motors of the electrical dives are stepper motors driven in discrete angular increments by electrical pulses provided by the electronic power and control system. In one embodiment the system further comprises a graphics program enabling a user to create and save a graphics file for driving the marker apparatus from dimensional data associated with a sign to be mounted on the surface. And in one embodiment the power and control system has input circuitry enabling data files to be entered and stored.

In another aspect of the invention a method for marking points on a surface at a distance is provided, comprising moving point light sources mounted individually in apparatus movable by electrical drives to position light spots on a surface at a distance in a pattern, and providing signals for manipulating individual ones of the electrical drives of the point light sources to position the light spots in the pattern by an electronic power and control system coupled to the marker apparatus.

In one embodiment the method further comprises executing an application providing interactive interfaces on a display of a computerized appliance, being one of a laptop computer, a smartphone or a pad device, enabling input of commands for manipulating the electrical drives. Also, in one embodiment the method further comprises executing software by a CPU in the electronic power and control system, the CPU coupled to a data repository comprising data for controlling the marker apparatus to position the point light sources to provide the light spots in the pattern. In one embodiment the method comprises storing the data in a data file on the computerized appliance and executing the data by the application to control the marker apparatus. And in one embodiment the method comprises driving, by the electrical motors, compound planetary gear trains with output shafts having physical apparatus in which individual point light sources are mounted, the output shafts torque-biased in one direction to eliminate any play in motor apparatus or gear trains.

In one embodiment the method comprises mounting individual ones of the point light sources in physical apparatus wherein one electrical drive is enabled to rotate a point light source in a first plane defined by an axis of the point light source, the rotation providing translation of a light spot in a line on the surface for mounting the sign. Also in one embodiment the method comprises mounting the plurality of point light sources with drives moving the sources in the first plane on a surface driven by a separate electrical drive to rotate the point light sources mounted on the surface in a second plane orthogonal to the first plane. Also, in one embodiment the electrical motors of the electrical dives are stepper motors driven in discrete angular increments by electrical pulses provided by the electronic power and control system. In one embodiment the method further comprises creating and saving a graphics file by a graphics program for driving the marker apparatus, from dimensional data associated with a sign to be mounted on the surface. And in one embodiment the method comprises entering and storing data files to the power and control system through input circuitry.

DETAILED DESCRIPTION OF THE INVENTION

Embodiments of the instant invention are applicable for mounting a broad variety of objects, equipment and assemblies to surfaces. A typical application is in the location and installation of signs of various sorts, although the invention is not limited to signs. Installation of signs is described in some detail in several examples below, as a single instance of the many sorts of objects, equipment and assemblies that may be thus installed.

Figure 1:
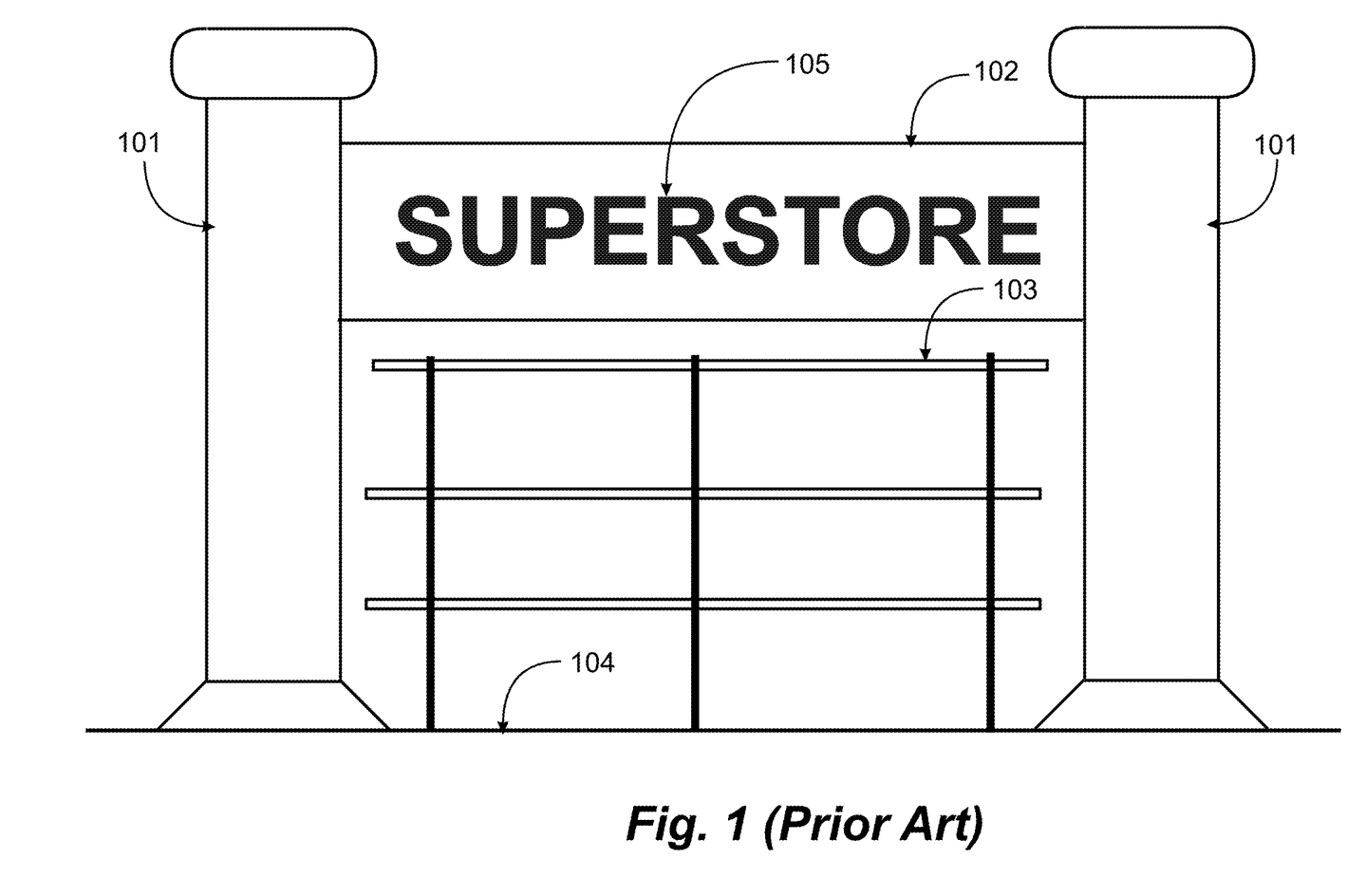
FIG. 1 is an elevation view of a vertical surface upon which a sign comprising individual letters is installed in an embodiment of the present invention.

FIG. 1 is an elevation view of a vertical surface 102 upon which a sign comprising individual letters is installed. In some circumstances a sign to be installed comprises a sequence of letters of logos, or a mix, as is shown in FIG. 1 for "SUPERSTORE" and in some circumstances a sign may be preassembled in a frame, such as a box-like frame, as is shown for a sign "ACME TOOLS" shown in FIG. 2 described below. In either circumstance there must be means for fastening the sign, either as the box frame, or as single or combinations of letters or other indicia, to surface 102. In addition to fastening the sign or components of the sign to the surface, it is often necessary to provide electrical conductors to elements, such as illumination elements, in the sign. Power may also be needed to drive, in some cases, moving elements.

Surface 102 in FIG. 1 is a part of a structure supported between two pillars 101, which may be identical, and is presented at a height above ground level 104 which will render a sign, such as sign 105, visible and readable from a distance. It is noted that sign 105 is not a singular structure, but a series of separate letters, each of which must be mounted on surface 102 to accomplish the sign.

Figure 2:
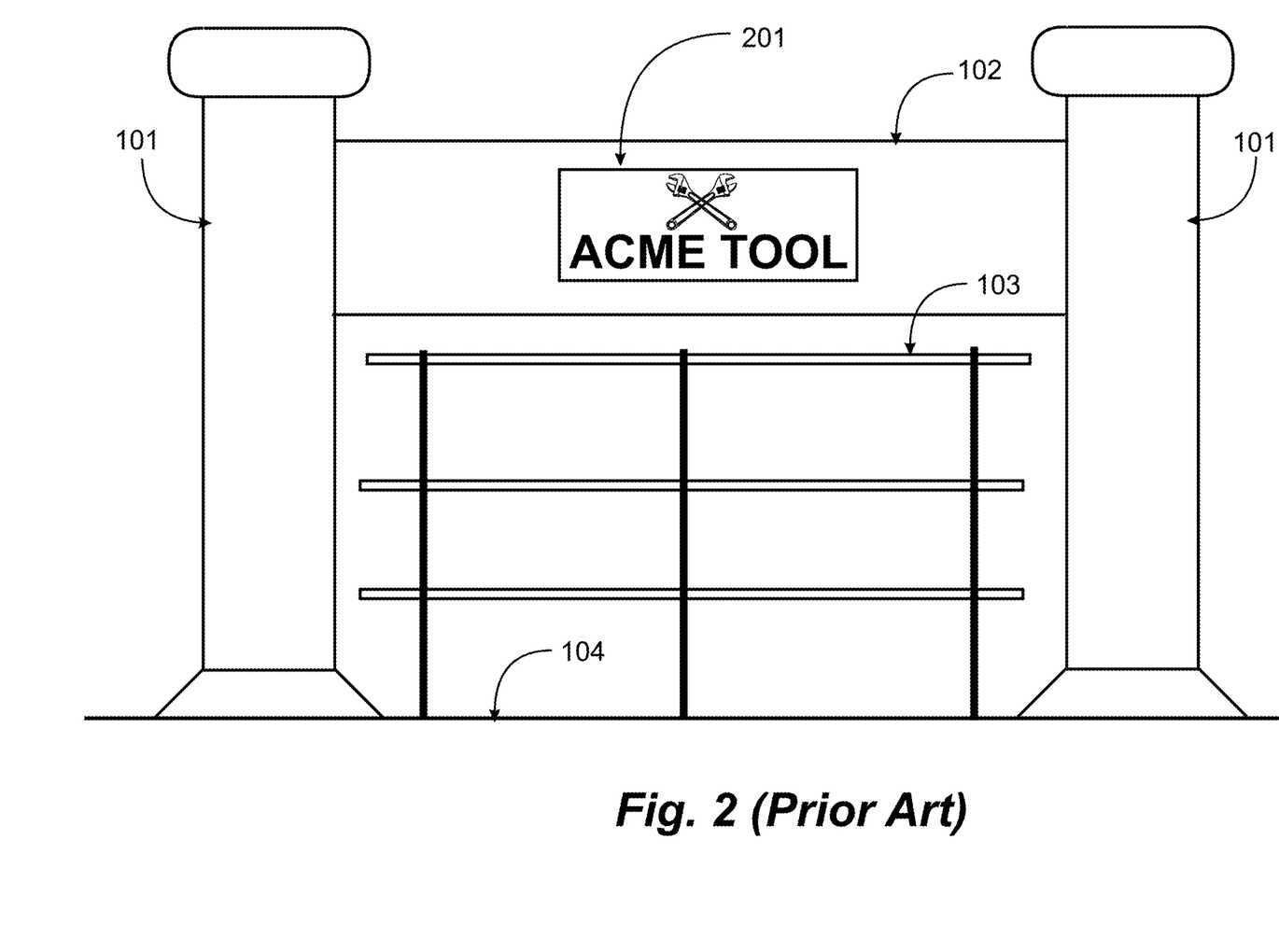
FIG. 2 is an elevation view of the vertical surface of FIG. 1 with a box-frame sign installed.

FIG. 2 is an example of a sign preassembled in a box-like frame, having both letter and symbolic elements. The letters and other elements of this sign are already fastened to the box structure, and there may be preassembled illumination and manipulation elements, as well, and in some circumstances only a single power conductor need be provided. There will, however, be a need for mounting holes in surface 102 for mounting the box frame of sign 201 to surface 102.

A conventional way to install a sign of either sort shown in FIGS. 1 and 2 on a surface like surface 102 is to employ ladders to reach the area of the proposed sign or to erect a scaffold, shown as scaffold 103 in FIG. 1. Workers may mount the scaffold with stepladders, or there may be steps in the scaffold arrangement. In any case the upper surface of the scaffold is at a height that workers may easily reach the area where letters or a box structure are to be mounted to implement the sign.

A common procedure in sign installation is to unroll a template and to tape or otherwise mount the template to the region of the surface where the sign is to be installed. One may then mark the points through the template where mounting hardware or electrical penetration is to be accomplished.

Figure 3:
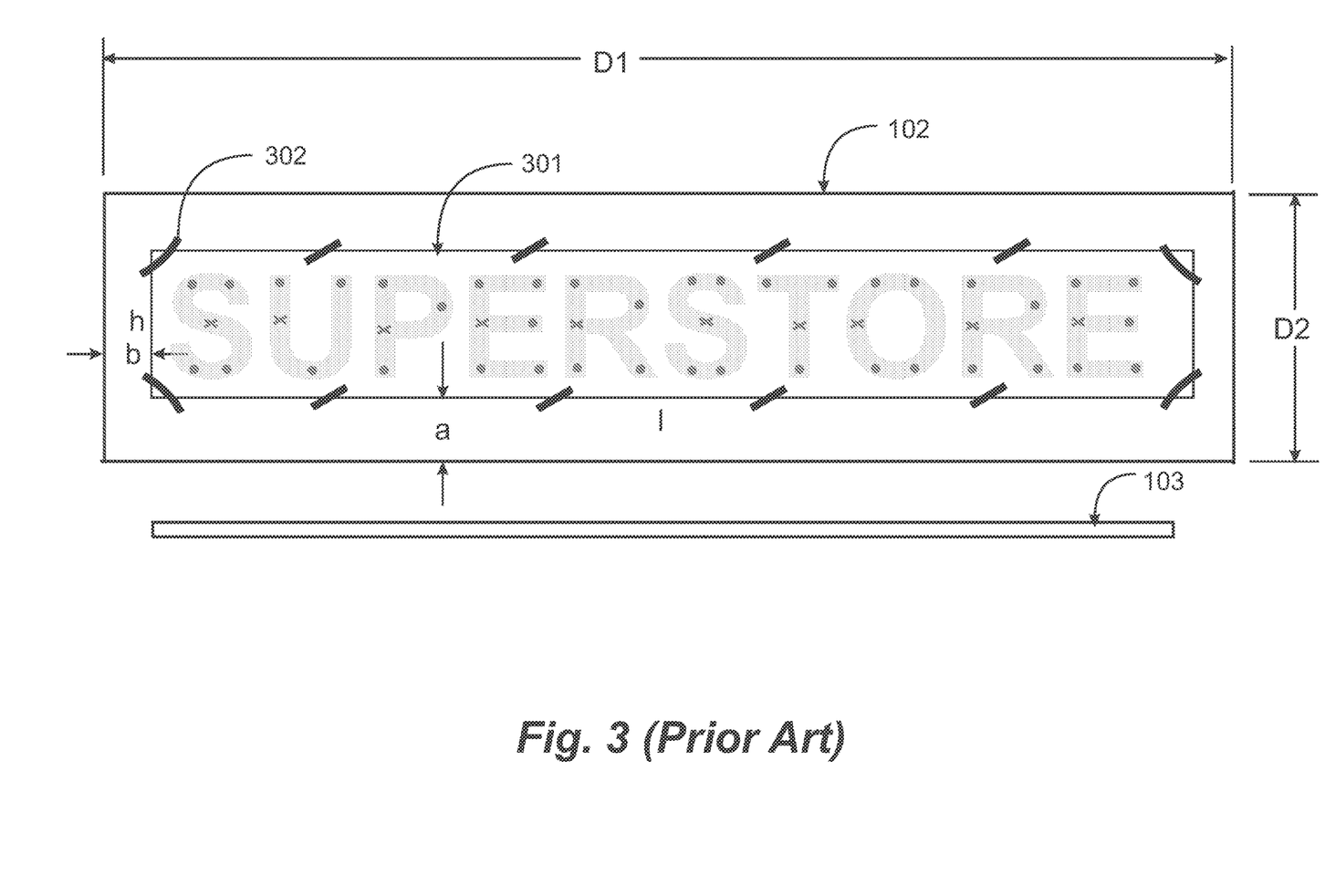
FIG. 3 is an elevation view of the surface of FIG. 1 showing a template in place for the sign of individual letters.

FIG. 3 is an elevation view of surface 102 with a template 301 for sign 105 taped to the surface by tape strips 302. It should be clear that a template may also represent the holes locations needed for mounting box sign 201 of FIG. 2, although the example of FIG. 3 should suffice for both. In this example there are points marked on the template to indicate fastening points for hardware to support the letters of sign 105, and points for openings to be provided in surface 102 for electrical connection for illumination and such like in each letter of the sign. In this example mounting positions are round points and places for electrical penetration are marked as X. Each letter of the sign is to have one electrical penetration and plural mounting points for hardware fasteners.

There may be differences of opinion as to where mounting holes for letters may be placed in different letters, but the placement in single letters is not the point of the invention. In embodiments of the invention, for a sign with separate letters, there will typically be several mounting holes for secure mounting of each letter, and perhaps one opening for electrical power per letter. A box sign will have several mounting holes and typically at least one hole for electrical power.

To accomplish the marking in the prior art procedure, the location of the template is important. The worker performing the project must have dimensions and geometry for the template. If the template is rectangular, as in this example, then it is needed to know the length and height (1 and h in FIG. 3) of the template. Given the dimensions D1 and D2 of the surface 102 upon which the sign is to be mounted, one may determine offsets "a" and "b" for centering the template on surface 102, assuming the sign is to be centered in the area. The worker mounting the sign may now use conventional measuring appliances to mark the surface to mount the template. Actual mounting of the template may require taping one upper corner at one end, then an opposite corner at the other end, then measuring the edge using a leveling instrument to be sure the template is level, so the sign will be level when mounted. In some cases, level is not especially required, and the template may be aligned to a ground line or other objects or equipment. Then the template may be taped in a number of places, as shown, with tape strips 302, to have the template securely mounted to the surface in the proper place.

The skilled person will understand that the procedure described here as prior art may be done somewhat differently and in a different order to accomplish mounting of the template in a way that the resulting sign may be properly placed and mounted. Once the template is securely and properly placed the worker may mark through the marks on the template for the mounting points and electrical penetrations. These may be marked in different colors to distinguish after the template is removed. There are other ways to distinguish between a position for a mounting point or an electrical penetration. Once the markings are made, the template may be removed and rolled or folded, and may be stored to hopefully be found and used again when another such sign is to be installed. Quite often a template may be created specifically for one job, and then may be discarded.

To continue the conventional process, once hole positions are marked through the template, holes may be drilled at all of the mounting points, and hardware, such as screw anchors of one sort or another may be mounted in the holes. The type of screw anchor will depend at least in part on the nature of construction of the surface 102, and in some circumstances on the nature of the box sign or letter to be mounted. At the electrical penetrations, holes of a pre-determined diameter may be drilled, and inserts may also be applied to insulate and reinforce for passage of electrical conductors. Once all of the preparatory work is finished, the actual letters or the box may be mounted to the surface and may be electrically connected.

Figure 4:
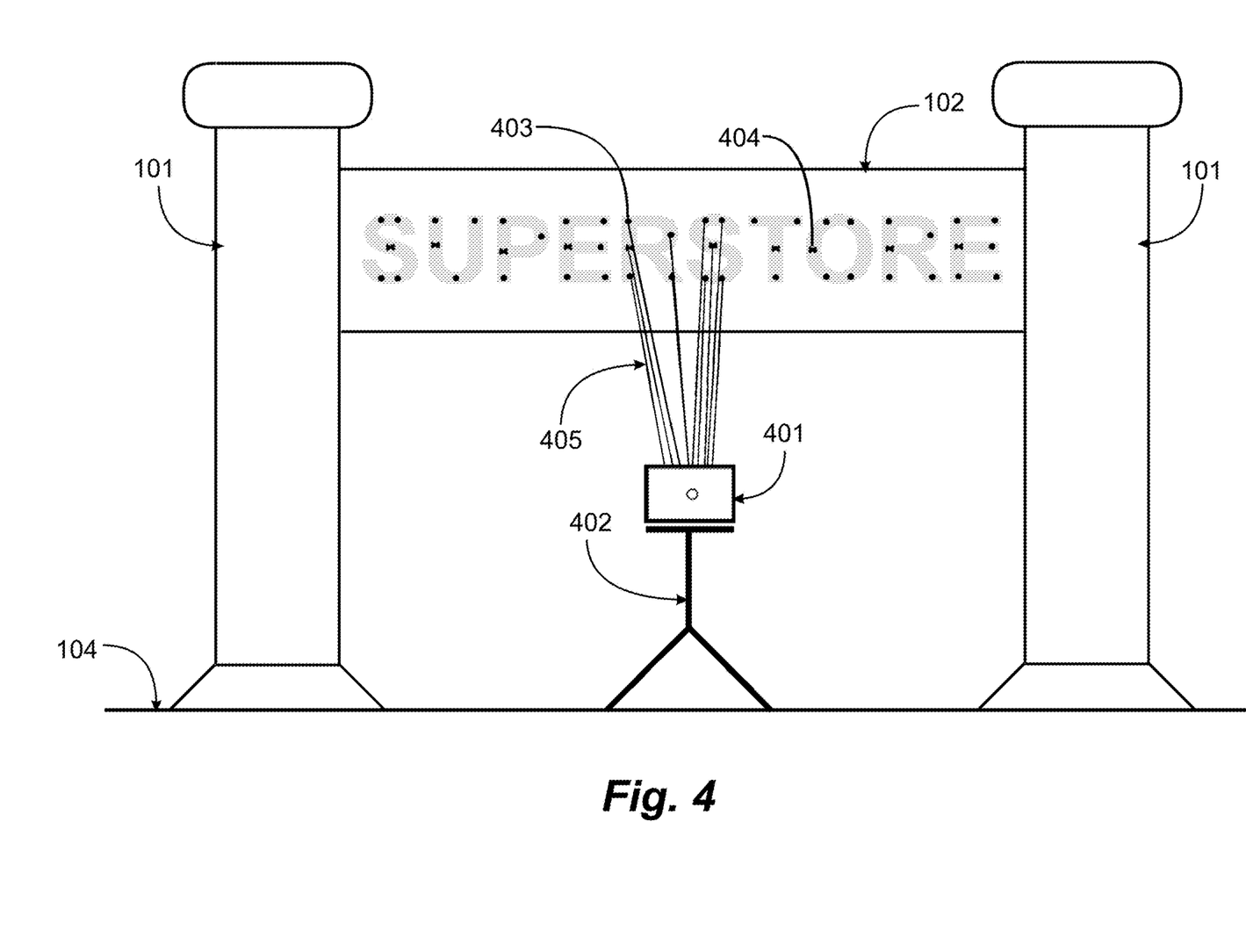
FIG. 4 is the elevation view of the vertical surface of FIG. 1 showing in part a solution according to an embodiment of the present invention.
Figure 5:
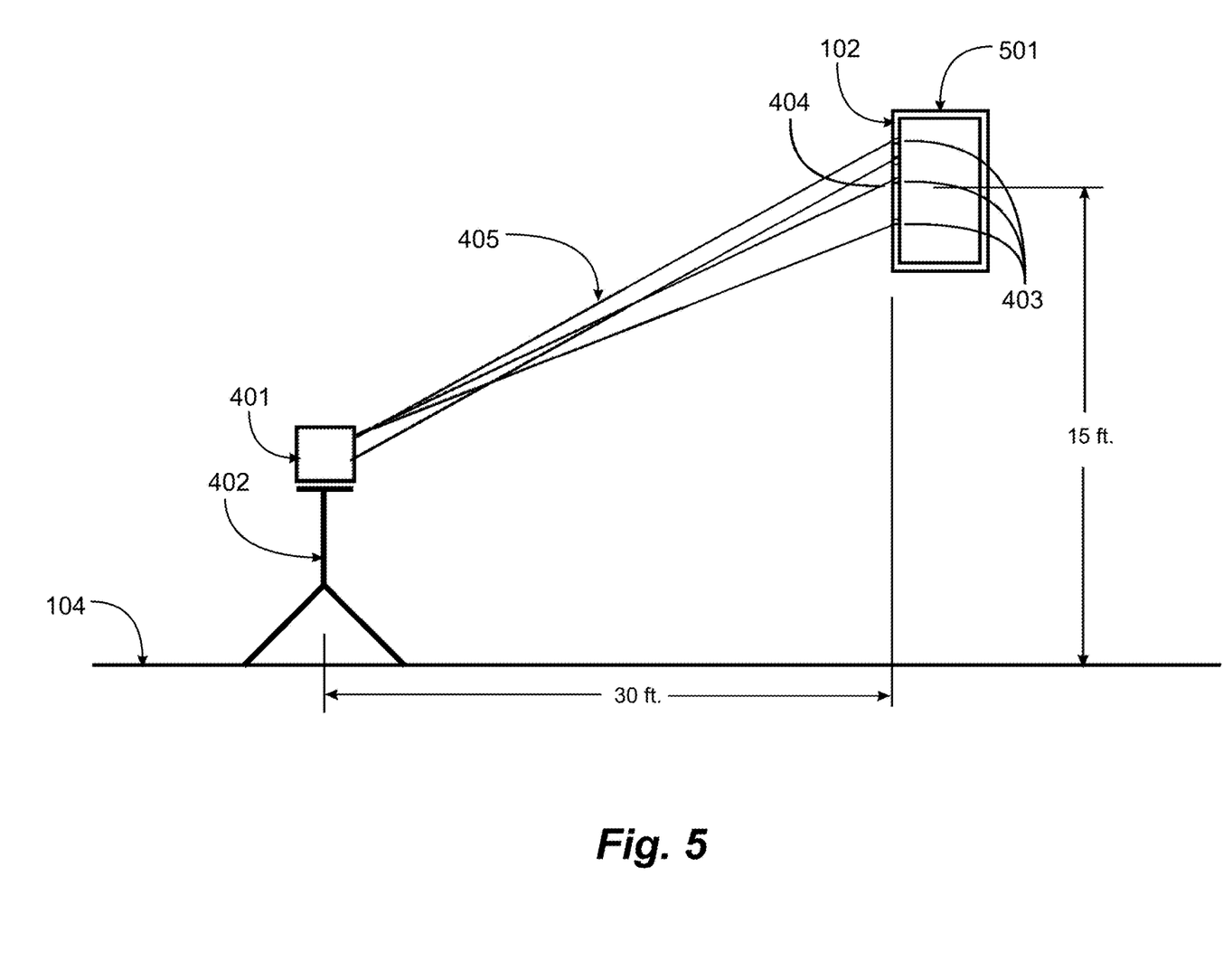
FIG. 5 is a side elevation view of the solution of FIG. 4.

FIG. 4 is an elevation view of vertical surface 102 of FIG. 1 showing, in part, a solution according to an embodiment of the present invention. FIG. 5 is a side elevation view of the arrangement of FIG. 4 to illustrate further detail. In FIGS. 4 and 5 a light-point marker apparatus 401 is supported on a sturdy support 402 resting on ground surface 104, and individual light-point sources in marker apparatus 401 (not seen in FIG. 4 or FIG. 5) are directed in exactly the required directions to illuminate a plurality of spots 403 and spots 404 on surface 102 where mounting hardware and electrical pass-through holes are needed for one or more letters of sign 105. In FIG. 4 spots 403 are spots for mounting hardware to mount letters of sign 105, and spots 404 are spots for pass-through holes for electrical connection. In the example of sign 105, requiring ten separate letters in the word "SUPERSTORE", each letter for secure mounting to surface 102, will need at least three mounting points 403, and each letter will require at least one electrical pass-through in surface 102. In FIGS. 4 and 5 lines 405 are directed lines of light from light-point sources in marker apparatus 401.

FIG. 4 shows a cross-section of a part 501 of a building structure providing surface 102. Pillars 101 are not shown. Marker apparatus 401 supported by support 402 is illustrated as directing separate focused beams of light onto surface 102. Points illuminated on surface 102 may be locations for spots 403 and 404 as described above.

Further, in FIGS. 4 and 5, light-point marker apparatus 401 is illustrated as projecting points of light for just two letters of the sign, in this example letters "R" and "S" near the center of the word "SUPERSTORE". In one embodiment of the invention separate light-point sources are provided in marker apparatus 401 for each mounting point and each pass-through hole. In a simple sign with few letters, all the necessary spots may be illuminated simultaneously. In a sign with a large number of letters, as illustrated here, a marker apparatus according to an embodiment of the invention may have only enough light-point sources to illuminate spots for two or three letters. The differences are matters of choice and convenience, and not limiting to the scope of the invention, as an apparatus may theoretically have any number of separately adjustable light-point sources. Enabling detail of marker apparatus 401 and support 402 is provided below in this specification.

Figure 6:
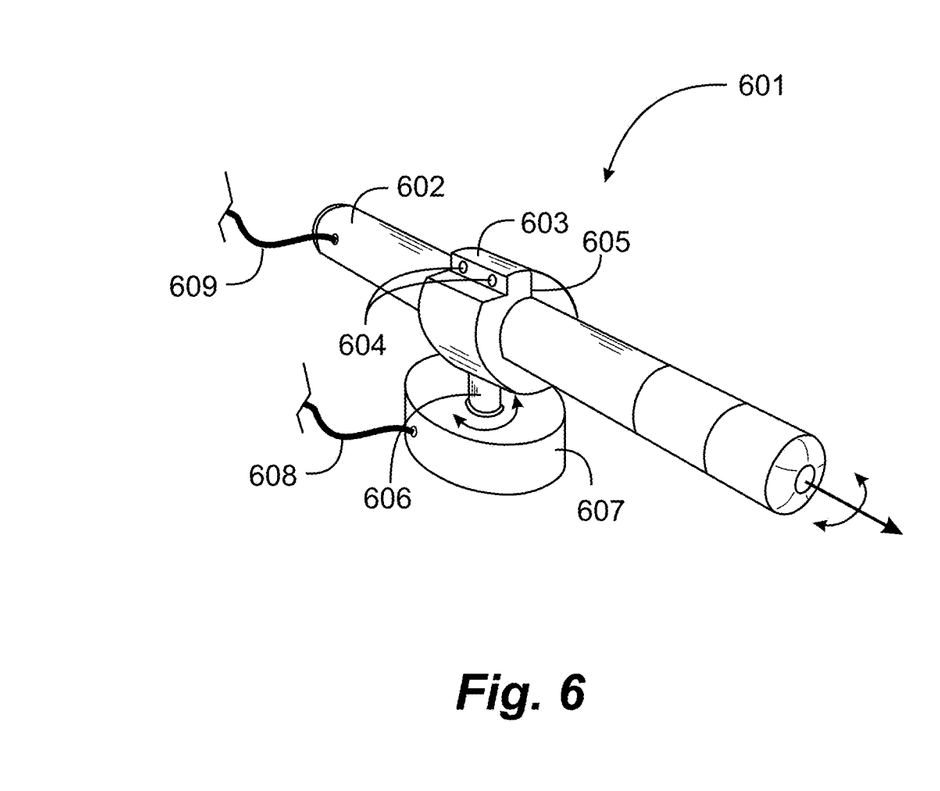
FIG. 6 is a perspective view of a focused light-emitting device mounted in a motor-driven pivotal base according to an embodiment of the present invention.

FIG. 6 is a perspective view of a light assembly 601 comprising a focused pinpoint light-emitting device 602 mounted by a clamp mechanism 603 to a rotatable shaft 606 driven by a cylindrically-shaped rotary drive 607.

Light-emitting device 602 in this example may be any of a variety of commercially-available devices, most of which are shaped as longitudinal cylinders, as is device 602. To operate in the present invention the device must be capable of providing a pinpoint of light at a substantial distance, such as perhaps thirty feet. Some such devices are laser-based.

Clamp 603 in this example is split at line 605, and closed by two conventional bolts in holes 604, engaging threads opposite split line 605. Clamp 603 is integral to, or securely mounted to rotatable shaft 606, which is driven by an electric motor in drive 607 through a series of gears, as is described in enabling detail below. Through operation of the electric motor in drive 607 shaft 606 is driven at a rate very much attenuated compared to the RPM capability of the motor. Through operation of drive 607 the light source may be pivoted left and right to reposition a point of light on a surface at a distance. Drive 607 is powered through cable 608, which may also carry sensor and control signals, such that a control system, also described below, can know exactly the angular orientation of the light source. Light-emitting device 602 in this example may be battery powered but may also be turned on and off and may be powered through cable 609.

Figure 7:
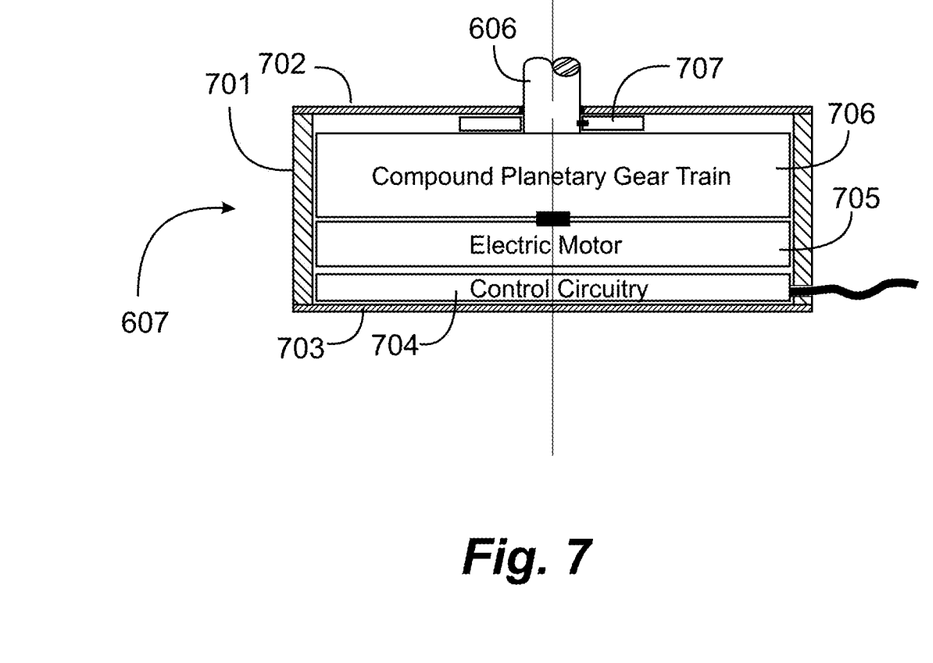
FIG. 7 is a diagrammatical representation of a drive for a marker apparatus specifying some important elements and parameters of the drive, in an embodiment of the invention.

FIG. 7 is a diagrammatical representation of drive 607 specifying some important elements and parameters of the drive. Drive 607 in one embodiment has a cylindrical body 701 with a metal top 702 and bottom 703. Diameter and construction may vary in different embodiments depending at least in part on characteristics of elements in the assembly. Fastening and sealing elements are not shown.

Drive 607 comprises control circuitry 704 connected externally by cable 608 to a control system not shown in FIG. 7. An electric motor 705 powered through control circuitry 704 drives, in this example, a compound planetary gear system 706, which in turn drives shaft 606 upon which clamp 603 is mounted in one embodiment (see FIG. 6). A strong biasing spring fastened between shaft 606 and body 701 applies torque in one rotary direction on shaft 606, hence the motor shaft and gear train, which assures that any play in connections and gears is eliminated.

The reduction ratio accomplished by gear train 706 is in many embodiments substantial, as much, for example, as 1000/1, so that a full rotation of motor 705 will result in only a small angular displacement of shaft 606. Motors, torque, gear ratios and the like will vary in various embodiments to suit specific purposes.

To clarify importance of gear reduction and the need for torque bias to eliminate play, consider that for a point source like that shown in FIG. 6, with a drive comprising a stepper motor that moves 1.8 degrees for each electrical pulse, which is ½₀₀ of a full revolution, having a 1000/1 reduction through gear train 706, one pulse to the motor will move a spot from the light source on a surface thirty feet away by about 0.01 inches. So, 100 pulses will move the spot about 1 inch. More exact dimensions may be easily calculated, and this representation is exemplary.

Figure 8:
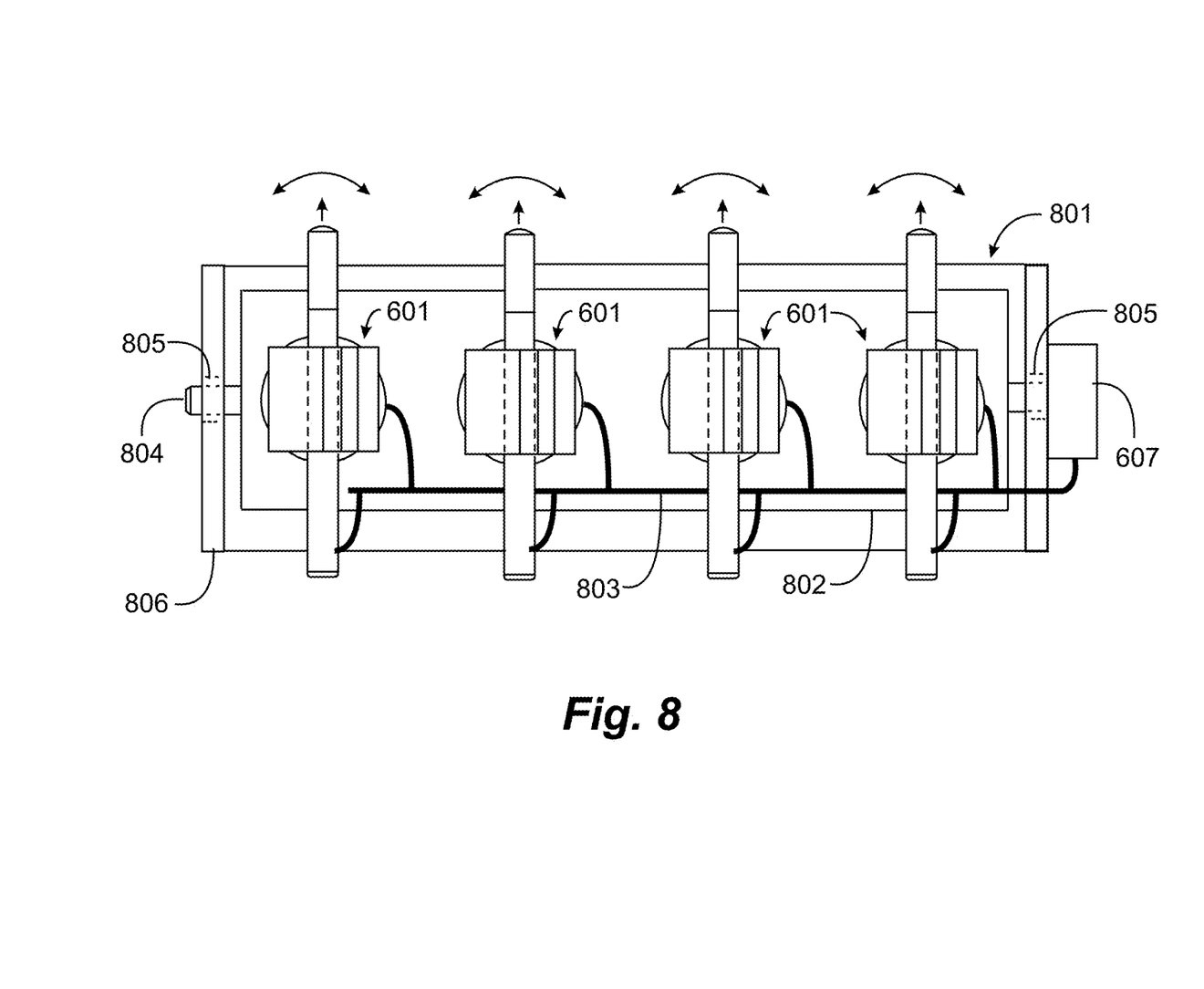
FIG. 8 is a plan view of an assembly comprising four light source assemblies mounted side by side securely on a metal plane plate in an embodiment of the invention.

FIG. 8 is a plan view of an assembly 801 comprising four light source assemblies 601 mounted side by side securely on a metal plane plate 802. The center-to-center distance in this example is three inches and may vary depending on circumstances. The three-inch separation may well be different in some other embodiments. It will be apparent that each light source 601 driven by a drive 607 may be independently rotated on a plane parallel to the plane of plate 802. Thusly four points illuminated on a surface at a distance will be along a substantially horizontal line but may be individually positioned along the horizontal line by rotating the light sources in the horizontal plane. Control and power cables for the four assemblies are shown combined into a single compound power and control cable 803.

Plate 802 is securely mounted on a shaft 804 that passes through bearings 805 mounted in vertical extensions of a frame 806 beyond each end of plate 802, and one end of shaft 804 is coupled to output of another drive 607, which enables plate 802 to be rotated about the axis of shaft 804. Rotation of plate 802 by drive 607 may be accomplished by single pulses that elevate or lower the substantially horizontal line on the remote surface common to the four light sources. The individual points of light therefore may be moved up or down on the remote vertical surface in unison and may also be adjusted in spacing horizontally, separately.

Figure 9:
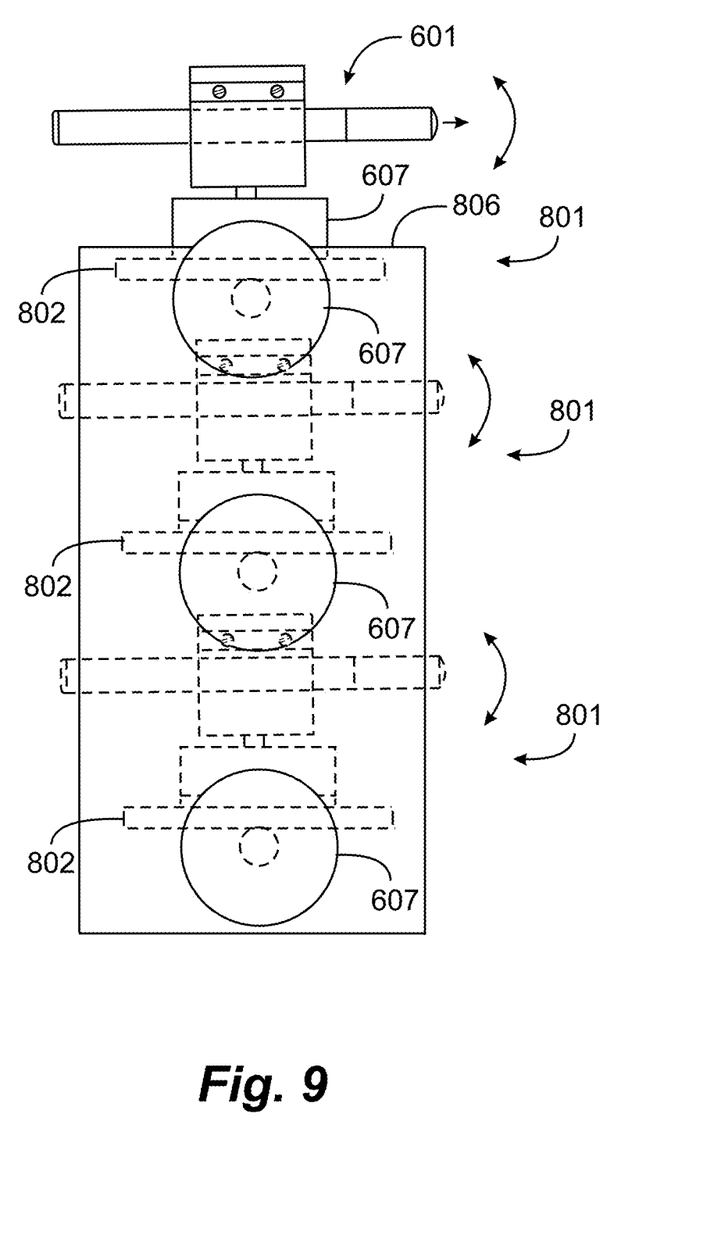
FIG. 9 is an elevation view of the assembly of FIG. 8 viewing along the axis of a shaft, showing three assemblies comprising planar plates in an embodiment of the invention.

FIG. 9 is an elevation view of the assembly of FIG. 8 viewing along the axis of shaft 804, showing three assemblies 801 comprising planar plates 802, each carrying four assemblies 601, arranged one above the other, each plate mounted on a shaft 804 in bearings mounted in frame 806. Rotating shafts 804 individually tilt each plate 802, which raises and lowers the direction of the four point-light sources mounted to each plate.

Although not shown in the interest of clarity, each of plates 802 have a bias spring arrangement which urges the plate in one rotary direction, to assure that all play in bearings and couplings is eliminated. This assures accuracy of the placing and moving of points of light.

This arrangement has twelve light sources, four each carried on each of three rotatable plates, each light source 601 driven by a separately-controllable drive 607. Three additional drives 607 serve to tilt the three plates upon which light sources are mounted. Thusly twelve points of light may be cast on the vertical surface where a sign is to be mounted. Four point5s are positioned along each of three horizontal lines, which may be adjusted in vertical separation, and each of the four points of light at each level may be adjusted in position along the common horizontal line.

This arrangement takes advantage of the fact that in nearly all sign installations there will be mounting holes and electrical pass-through holes that are positioned on common substantially horizontal lines. This is readily apparent from FIG. 3, for example. Every letter may have at least one mounting hole near the top of the letter, regardless of the character, and it would make no sense to locate these letters at different heights. A common horizontal line for all of these letters makes sense. Further, for most letter signs, each letter may have a mounting hole near the middle height of the letter, and a third near the bottom, and these holes in a pattern for a number of letters may also be along common horizontal lines. Still further, the same relationship holds for box-frame signs. It is this commonality that supports the example of system 901, having three assemblies 601 arranged vertically, such that four spots may be raised and lowered simultaneously for each of three levels.

It will be apparent to the skilled person that the mechanical details of system 901 and its components are exemplary, and that there may be many other ways this functionality may be accomplished within the scope of the invention. It is, for example, theoretically possible that many more point light sources might be implemented on one level on a single plate that may be tilted to raise and lower the direction of the sources. There is theoretically no limit to the number at each level, or to the number of levels.

Further, in some embodiments each point light source may have two drive motors, one for lateral adjustment and the other for vertical adjustment, such that each point light source is independent in positioning.

It remains to describe how system 901, as an example, may be controlled to position light points on a mounting surface to properly mount either box-frame signs or individual letters for a sign.

Figure 10:
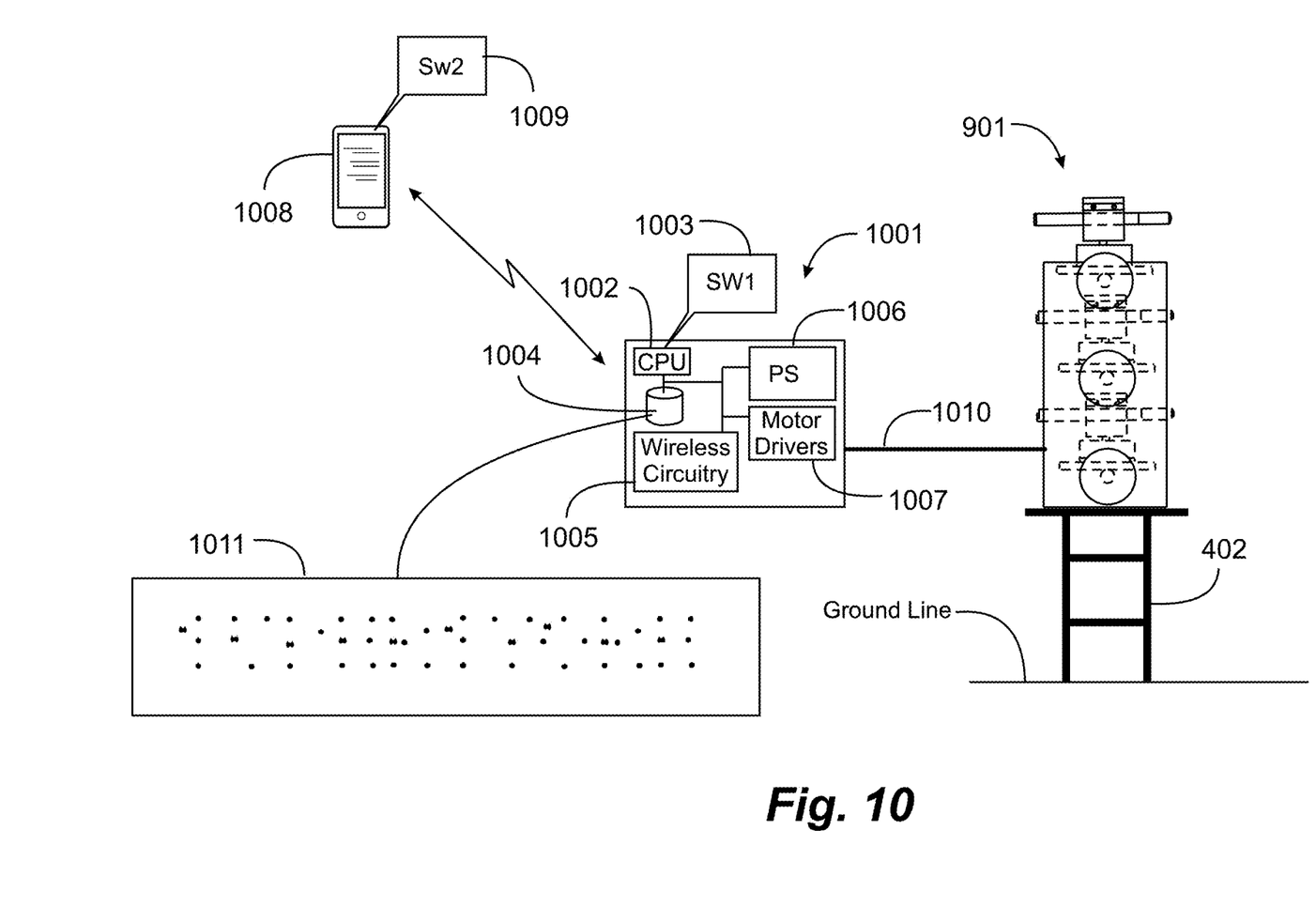
FIG. 10 is a diagrammatical representation of control circuitry and other elements that may be used to position markers for mounting a sign in an embodiment of the invention.

FIG. 10 is a diagrammatical representation of control circuitry and other elements that may be used to position markers for mounting a sign. Control circuitry 1001 comprises in this example a CPU 1002 communicating with a data repository 1004, wireless communication circuitry 1005, a power supply 1006 and motor drivers 1007. CPU 1002 in some embodiments executes SW1, labeled element 1003. In one embodiment a cellular smartphone 1008 executes an application 1009, labeled SW2, and communicates with control circuitry 1001. In this example smartphone 1008 is an example of a computerized appliance which may be used in control operations. The computerized appliance may in other embodiments be either a laptop computer or a computerized pad device, such as an iPad. In some embodiments the remote computerized appliance, shown in FIG. 10 as a smartphone, may be a proprietary device developed specifically for embodiments of the present invention.

In operation a user operating smartphone 1008 may command functionality of circuitry 1001 to operate marker system 901. A file 1011 stored in data repository 1004, associated with a specific sign to be installed, may be consulted, for example, which file specifies the location of all of the points to be marked to prepare mounting holes and hardware on a vertical surface, and pass-through holes in the surface for electrical lighting and operation of components of the sign. In some embodiments the data necessary to position the light points may not be stored in a file, as shown, but may be streaked from an Internet-connected source, for example.

Power Supply 1006 is represented generally as providing power to all of the electric motors, in this example stepping motors, of system 901 through cables generally labeled 1010. Pulses are provided as needed to operate the individual motors as needed to rotate units 601 (left and right) and 801 (up and down) to position each of twelve points of light where needed to mark a point for mounting or pass-through. CPU 1002 executing SW1 (1003) keeps track of the instant position of each point light source and updates the positions with each new pulse moving a source. Furthermore CPU 1002 through SW1 may zero the apparatus, that is, move all point sources to a default position prior to further operation.

In operation marker 901 may reside on a sturdy base 402, which may be supported on a ground line surface, such as pavement in a parking lot or a sidewalk. The surface where a sign is to be mounted may be at a higher elevation and a distance from marker 901. A distance of thirty feet was used as an example above and will serve to illustrate the issues here as well. Referring back to FIG. 5, consider D1 is thirty feet, and H1, to the center of part 501, is fifteen feet. This is important, because the amount that a point of light on surface 102 will move relative to pulses to the stepping motor that will move that point of light, depends at least in part on this geometry.

In one embodiment of the invention the height of the surface upon which a sign may be mounted may be known from existing data or may be measured in any of several ways. In one embodiment, knowing the height, a user may place support 402 intentionally at a distance D1. In another embodiment, there may be physical circumstances that limit where support 402 may be placed. In yet other circumstances support 402 may be located on a vehicle, like a service truck, or may be mounted on a tracked vehicle made specifically for the purpose. In any case, there will be a D1 and an H1, and the ratio may be used in an algorithm executed in either the smartphone, or other computerized appliance, or the control circuitry, to alter the calculations for movement of point light sources according to the geometry. The geometry and alterations in commands and functionality are not treated in detail here, as this should be apparent to the skilled person, having access to many reference materials.

File 1011 may comprise data as a cartesian matrix of points required to mount the sign, just as would be provided by a template 301 (FIG. 3). This is somewhat misleading, however, as the matrix in the file associated with the sign to be mounted may be represented in data in a very different way than cartesian coordinates. For example, a "home" or "zero" point may be identified for the locations of the points. This may be a single reference point, or may be a plurality of reference points, one for each of a group of letters in the sign, as is portrayed for example, in FIG. 4, where points for just two letters are indicated. Locations for each point to be marked on the mounting surface may then be referenced as cartesian coordinates from the reference point. A proper algorithm may use the coordinates and reference points, along with the distance and height from the marker, to command the marker apparatus, in pulses to specific stepper motors, to move point light sources to proper positions on surface 102, where a user my physically mark the surface or later drilling and implementation or may drill holes at the points illuminated. In alternative embodiments the data may be provided and executed as polar coordinates rather than in a cartesian system.

In some embodiments power and control system 1001 has input apparatus enabling data files to be entered and stored in the data repository. This may be, for example a USB port enabling connection of external electronic devices. Further, in some embodiments a graphics program may be provided and executed on the smartphone, or on such as a portable general-purpose computer, enabling a user to create files for driving a marker apparatus, and to store the files and transfer them to the smartphone or the power and control system. In some circumstances data may be streamed wirelessly between different units in the system.

In one use case example, it may be desired to install the SUPERSTORE sign on a vertical surface just as surface 102. Firstly, a work crew may set up, for example, a scaffold 103 enabling a worker to access all of the surface 102 where the sign is to be installed. The worker may have smartphone 108, or an equivalent device, enabling access to data and control of marker 901. The worker or other member of the crew may place marker 901, connected to control system 1001 at a pre-determined position, and the worker may indicate in the app executing on the smartphone the ratio of D1 to H1.

The worker may need to make some physical measurement in surface 102, and mark one or more reference points to locate the points for the sign. For example, it may be determined that the sign is to be centered left to right in the area of surface 102 but may be placed lower than center by a certain dimension. In a simple mode, there needs be just one reference mark made on the surface, to which all other positioning may be done. This may be a corner of the area the sign is to occupy, for example, or a center point for the sign, or some other reference point, as long as file 1011 associated with sign and the algorithms by which the manipulation of the mechanisms of marker 901 are accomplished, are aware of the reference used. There may be input to an interactive display on the smartphone, for example, indicating which reference default is to be used.

One a reference is marked, the worker with the device, executing SW2, may cause the marker point light sources to illuminate, and to display on surface 102. There may be inputs for the worker to move the display of the twelve points (in this example) in concert to properly relate to the reference point. Once the display of the multiple points is implemented, the points may be physical marked for later drilling and mounting or may be drilled without being marked.

As described above, for relatively simple signs, all points may be marked in a single pass, and then physical installation may proceed. For bigger, more complicated signs, portions may be sequentially accomplished, and referenced from previous markers.

A significant advantage of embodiments of the present invention is that there is no longer a need for paper or fabric templates. Time and effort are reduced, and precision is enhanced.

Again, as stated at the beginning of the detailed description, positioning and installing signs of various sorts, while a very important application in embodiments of the invention, is just one of many applications. Implementations of the invention may be provided for marking mounting locations for cabinets in kitchen installations, for locating and mounting computer equipment in computer rooms, for marking and locating equipment in clean rooms, and for marking mounting and service points in many disparate construction applications.

A skilled person will understand that there are many alterations that may be made in the examples described within the scope of the invention. There are many ways the movement of light points may be accomplished and coordinated, and many alternative constructions of marker apparatus and control systems. The scope of the invention is only limited by the claims below.

I claim:

1. A system for marking points on a vertical surface at a distance, comprising:
    a marker apparatus comprising a plurality of point light sources mounted side-by-side on a flat plate along a line parallel to the vertical surface at a distance, the flat plate mounted on a horizontal shaft also parallel to the vertical surface at a distance, the horizontal shaft driven by a first electrical drive tilting the flat plate forward and back such that light spots projected by the plurality of point light sources move vertically on the vertical surface, each point light source having a long axis in the direction of projection of the light source, with each point light source constrained in an apparatus movable by a second electrical drive to rotate the light source in a plane defined by the long axis, such that a light spot projected on the surface at a distance will move in a horizontal line as the light source is rotated; and
    an electronic power and control system coupled to the marker apparatus, providing signals for manipulating individual ones of the first and second electrical drives to position the light spots on the vertical surface;
    wherein the light spots on the vertical surface are moved vertically in unison in a horizontal line by controlling the first electrical drive and spacing between light spots in the horizontal line is changed by controlling the second electrical drives.

2. The system of claim 1 wherein the electronic power and control system comprises a computerized appliance executing an application providing interactive interfaces on a display of the appliance, enabling input of commands for manipulating the first and the second electrical drives.

3. The system of claim 2 further comprising a CPU in the electronic power and control system executing software and coupled to a data repository comprising data for controlling the marker apparatus to position the point light sources.

4. The system of claim 3 further comprising a graphics program enabling a user to create and save a graphics file for driving the marker apparatus from dimensional data associated with a sign to be mounted on the surface.

5. The system of claim 4 wherein the power and control system has input mechanisms enabling data files to be entered and stored.

6. The system of claim 2 wherein the computerized appliance has Bluetooth™ circuitry for communicating with a remote Bluetooth™-enabled portable device, the system further comprising a Bluetooth™-enabled portable device executing software providing interactive interfaces on a display of the Bluetooth™-enabled portable device, whereby a user is enabled to exercise limited control of the first and the second electrical drives to move projected points on the vertical surface at a distance.

7. The system of claim 1 wherein the first and the second electrical drives comprise electrical motors driving compound planetary gear trains with output shafts driving physical apparatus in which individual point light sources are mounted, and the output shafts are torque-biased in one direction to eliminate any play in motor apparatus or gear trains.

8. The system of claim 7 wherein the electrical motors of the first and second electrical dives are stepper motors driven in discrete angular increments by electrical pulses provided by the electronic power and control system.

9. A method for marking points on a vertical surface at a distance, comprising:
    mounting a plurality of point light sources side-by-side on a flat plate along a line parallel to the vertical surface at a distance, the flat plate mounted on a horizontal shaft also parallel to the vertical surface at a distance, the horizontal shaft driven by a first electrical drive tilting the flat plate forward and back such that light spots projected by the plurality of point light sources move vertically on the vertical surface, each point light source having a long axis in the direction of projection of the light source, with each point light source constrained-in an apparatus movable by a second electrical drive to rotate the light source in a plane defined by the long axis, such that a light spot projected on the surface at a distance will move in a horizontal line as the light source is rotated; and
    providing signals for manipulating individual ones of the first and second electrical drives to position the light spots by an electronic power and control system coupled to the marker apparatus;
    wherein the light spots on the vertical surface are moved vertically in unison in a horizontal line by controlling the first electrical drive and spacing between light spots in the horizontal line is changed by controlling the second electrical drives.

10. The method of claim 9 further comprising executing an application providing interactive interfaces on a display of a computerized appliance, enabling input of commands for manipulating the first and the second electrical drives.

11. The method of claim 10 further comprising executing software by a CPU in the electronic power and control system, the CPU coupled to a data repository comprising data for controlling the marker apparatus to position the point light sources to provide the light spots in the pattern.

12. The method of claim 11 further comprising creating and saving a graphics file by a graphics program for driving the marker apparatus, from dimensional data associated with a sign to be mounted on the surface.

13. The method of claim 12 comprising entering and storing data files to the power and control system through input mechanisms.

14. The method of claim 10 wherein the computerized appliance has Bluetooth™ circuitry for communicating with a remote Bluetooth™-enabled portable device, the system further comprising a Bluetooth™-enabled portable device executing software providing interactive interfaces on a display of the Bluetooth™-enabled portable device, further comprising a user exercising limited control of the first and the second electrical drives to move projected points on the vertical surface at a distance.

15. The method of claim 9 comprising driving, by the electrical motors, compound planetary gear trains with output shafts having physical apparatus in which individual point light sources are mounted, the output shafts torque-biased in one direction to eliminate any play in motor apparatus or gear trains.

16. The method of claim 15 wherein the electrical motors of the first and second electrical dives are stepper motors driven in discrete angular increments by electrical pulses provided by the electronic power and control system.

\* \* \* \* \*